(12) United States Patent
Schreiber

(10) Patent No.: US 8,777,577 B2
(45) Date of Patent: Jul. 15, 2014

(54) HYBRID FAN BLADE AND METHOD FOR ITS MANUFACTURE

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1483 days.

(21) Appl. No.: 12/003,246

(22) Filed: Dec. 21, 2007

(65) Prior Publication Data

US 2008/0152858 A1    Jun. 26, 2008

(30) Foreign Application Priority Data

Dec. 21, 2006    (DE) .......................... 10 2006 061 915

(51) Int. Cl.
| | | |
|---|---|---|
| F01D 5/28 | (2006.01) | |
| B21D 53/78 | (2006.01) | |
| F04D 29/32 | (2006.01) | |
| B29C 70/34 | (2006.01) | |
| F04D 29/38 | (2006.01) | |
| B29D 99/00 | (2010.01) | |
| B23P 15/04 | (2006.01) | |
| F02K 3/06 | (2006.01) | |
| F01D 5/14 | (2006.01) | |
| B29K 707/04 | (2006.01) | |

(52) U.S. Cl.
CPC .............. *F01D 5/147* (2013.01); *B21D 53/78* (2013.01); *F04D 29/324* (2013.01); *B29C 70/345* (2013.01); *F04D 29/388* (2013.01); *F05D 2300/603* (2013.01); *B29D 99/0025* (2013.01); *B23P 15/04* (2013.01); *F02K 3/06* (2013.01); *B29K 2707/04* (2013.01); *F05D 2230/23* (2013.01)

USPC ......................... 416/224; 416/226; 416/230

(58) Field of Classification Search
USPC .......... 416/224, 226, 229 R, 229 A, 230, 232, 416/233, 241 A
See application file for complete search history.

(56) References Cited

U.S. PATENT DOCUMENTS

| | | | | |
|---|---|---|---|---|
| 2,648,388 | A | * | 8/1953 | Haines et al. ................. 416/226 |
| 3,572,971 | A | * | 3/1971 | Seiwert ........................ 416/230 |
| 3,637,325 | A | | 1/1972 | Morley |
| 4,221,539 | A | | 9/1980 | Corrigan |
| 4,470,862 | A | | 9/1984 | More et al. |
| 4,594,761 | A | | 6/1986 | Murphy et al. |
| 5,486,096 | A | | 1/1996 | Hertel |

(Continued)

FOREIGN PATENT DOCUMENTS

| | | |
|---|---|---|
| DE | 1 956 885 A | 6/1970 |
| DE | 695 04 516 T2 | 4/1999 |

(Continued)

OTHER PUBLICATIONS

European Search Report dted Apr. 13, 2010 from counterpart application.

*Primary Examiner* — Christopher Verdier
(74) *Attorney, Agent, or Firm* — Timothy J. Klima; Shuttleworth & Ingersoll, PLC

(57) ABSTRACT

With a hybrid fan blade, the supporting structure (1) in fiber-composite material is enclosed by an enveloping structure (2) only in an area of the airfoil, with a suction-side sheet-metal cover of the enveloping structure being pre-stressed in tension and a pressure-side sheet-metal cover of the enveloping structure being pre-stressed in compression. This reduces the hazard of delamination between the enveloping structure and the supporting structure.

2 Claims, 1 Drawing Sheet

(56) References Cited

U.S. PATENT DOCUMENTS

| | | |
|---|---|---|
| 6,532,658 B2 | 3/2003 | Schreiber |
| 7,156,622 B2 | 1/2007 | Schreiber |
| 2004/0184921 A1* | 9/2004 | Schreiber .................. 416/229 R |
| 2007/0003415 A1* | 1/2007 | Gigas et al. ................... 416/232 |

FOREIGN PATENT DOCUMENTS

| | | |
|---|---|---|
| DE | 103 07 610 A1 | 9/2004 |
| EP | 11 06 783 B1 | 6/2001 |
| GB | 2391270 | 2/2004 |

* cited by examiner

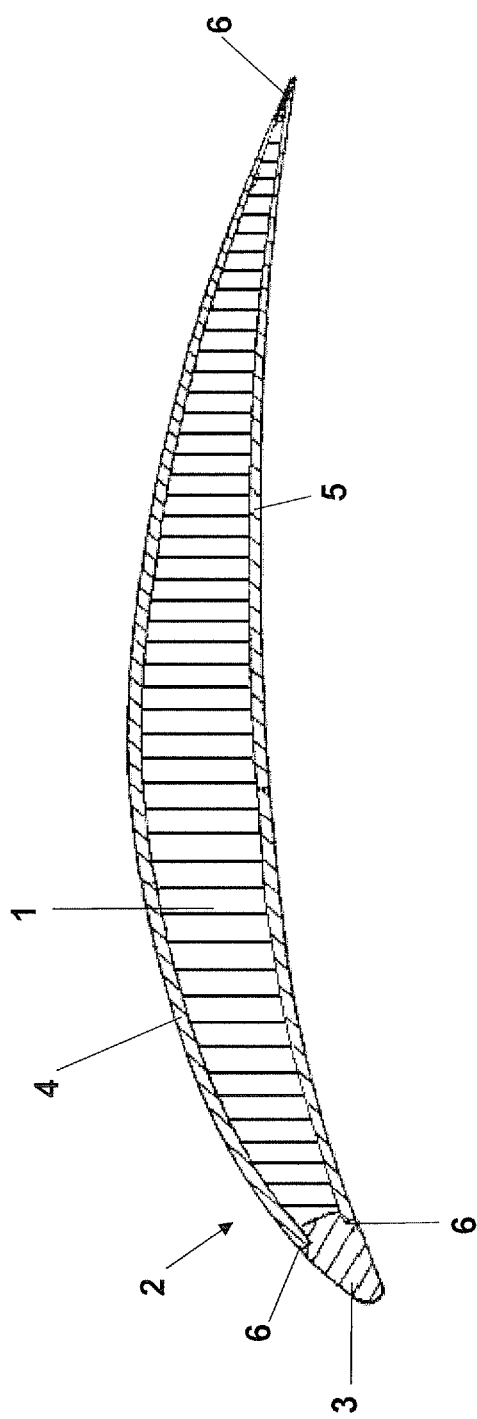

HYBRID FAN BLADE AND METHOD FOR ITS MANUFACTURE

This application claims priority to German Patent Application DE10 2006 061 915.3 filed Dec. 21, 2006, the entirety of which is incorporated by reference herein.

This invention relates to a hybrid fan blade for a gas-turbine engine which comprises a supporting structure in fiber-composite material as well as a metallic enveloping structure consisting of a convex suction-side sheet-metal cover and a concave pressure-side sheet-metal cover connected to the latter. It also relates to a method for the manufacture of such a hybrid fan blade.

Fan blades made of fiber-composite material combine relatively low weight with high specific strength and high intrinsic damping to reduce vibrations. For adequate erosion resistance and high impact strength against foreign bodies impinging on the blades, e.g. birds, the supporting structure in fiber-composite material is enclosed by a metallic enveloping structure. The high bending loads acting on the fan blade in the transition area between the airfoil and the blade root entail the hazard of separation of the enveloping structure from the supporting structure which is adhesively bonded to the inner surfaces of the enveloping structure, resulting in a considerable reduction in service-life of the hybrid fan blade.

A broad aspect of the present invention is to provide a design of a hybrid fan blade by which intimate connection between the supporting structure and the enveloping structure is obtained and, thus, a long service-life of the fan blade is ensured.

The basic idea of the present invention is to confine the enveloping structure enclosing the supporting structure to the area of the airfoil, with the suction-side sheet-metal cover being pre-stressed in tension and the pressure-side sheet-metal cover of the enveloping structure being pre-stressed in compression, thereby elastically pressing the enveloping structure against the supporting structure.

In a first variant, elastic pre-stressing of the sheet-metal covers can be achieved in that, upon adhesive bonding of the pressure-side sheet-metal cover to a pre-manufactured supporting structure, the suction-side sheet-metal cover, before being bonded to the supporting structure and welded to the pressure-side sheet-metal cover, is heated, as a result of which the suction-side sheet-metal cover expands, and, upon welding and cooling, returns to its initial shape, with the tensile stress thus produced in the suction-side sheet-metal cover acting upon the concave pressure-side sheet-metal cover, generating a compressive stress in the latter.

Alternatively, the elastic tensile or compressive stress can also be achieved in that the enveloping structure, with loosely laid-in fiber layers, is welded in a weld-molding tool such that it is initially given a pre-shape which is more slender than the final contour. Subsequently, a resin is infiltrated into the fiber material in an infiltration tool which has the final contour of the fan blade, actually into the sealed pre-shape of the enveloping structure, under a pressure so high that the suction-side sheet-metal cover of the enveloping structure is expanded fully against the inner contour of the infiltration tool, thereby being subjected to tensile stress which, as it acts upon the concave suction-side sheet-metal cover, produces an elastic compressive stress in the latter. The infiltration resin in this case effects the adhesive bond between the enveloping structure and the supporting structure.

As a result of the confinement of the enveloping structure to the area of the airfoil and the intimate connection with the fiber-composite material obtained by elastically pre-stressing the sheet-metal covers, the hazard of separation of the enveloping structure from the supporting structure due to blade vibration is reduced and service-life of the hybrid fan blades is increased. In the first-mentioned process variant, the connection between the enveloping structure and the supporting structure is further improved by the applicability of a specially suitable adhesive.

Embodiments of the present invention are more fully described in the light of the accompanying drawing.

FIG. 1 shows a sectional view of a hybrid fan blade in the airfoil area.

The hybrid fan blade comprises a supporting structure 1 in fiber-composite material which forms the blade root and the airfoil of a fan blade as well as a metallic enveloping structure 2 which is confined to the airfoil and consists of the solid-metal former 3, which provides the blade leading edge, as well as a suction-side sheet-metal cover 4 and a pressure-side sheet-metal cover 5. The two sheet-metal covers 4 and 5 are each joined to the former 3 and to each other at the trailing edge via the weld joints 6 and are elastically pre-stressed in tension on the suction side and in compression on the pressure side.

In the manufacture of the fan blade in accordance with a first process variant, the pressure-side sheet-metal cover 5 is initially welded to the former 3 and subsequently the pre-manufactured fiber-composite supporting structure 1 adhesively bonded to the inner surface of the pressure-side sheet-metal cover 5 in the area of the airfoil using a ductile adhesive. Then, ductile adhesive is also applied to the yet free surface (suction side) of the supporting structure 1. Subsequently, the suction-side sheet-metal cover 4 is heated, and thereby thermally expanded, and welded in this state to the former 3 and to the trailing edge of the pressure-side sheet-metal cover 5. During subsequent cooling, the suction-side sheet-metal cover 4 re-contracts to its initial length, thereby being elastically pre-stressed in tension, with the tensile stress simultaneously elastically pre-stressing the concave pressure-side sheet-metal cover 5 in compression, thus giving the airfoil its final contour. This means that the two elastically pre-stressed sheet-metal covers 4 and 5 are pressed against the fiber-composite supporting structure in tension or compression, respectively, so that the risk of delamination between the enveloping structure 2 and the supporting structure 1 is minimized—particularly since the airfoil is to a lesser extent affected by the high bending load between the blade root, which features no enveloping structure, and the airfoil.

According to a second process variant for the manufacture of hybrid fan blades with sheet-metal covers 4 and 5 pressed against the supporting structure in tension or compression, respectively, the pressure-side sheet-metal cover 5 is initially welded to the former 3 in a weld-molding tool, with the fiber material, for example a plurality of carbon-fiber layers, required for the manufacture of the supporting structure 1 subsequently being laid up into the weld-molding tool and here onto the pressure-side sheet-metal cover 5. Then, the suction-side sheet-metal cover 4 of the airfoil is welded to the former 3 and to the trailing edge of the pressure-side sheet-metal cover 5, actually such that the two sheet-metal covers of the enveloping structure 2—confined by the weld-molding tool—are closer together than necessary for the final contour of the airfoil. Subsequently, the carbon-fiber lay-up with the enveloping structure 2 provided for the airfoil is fitted into an infiltration tool whose inner dimensions correspond to the final contour of the fan blade. A seal towards the fiber lay-up is arranged at that end of the airfoil-confined enveloping structure 2 which is open to the blade root.

Infiltration resin is now loaded into the infiltration tool, actually under a pressure so high that the suction-side sheet-metal cover 4 is expanded in the sealed, slender pre-shape of the enveloping structure fully against the contour of the infiltration tool, thereby being pressed in tension against the now finished supporting structure of infiltrated carbon fibers, with the concave pressure-side sheet-metal cover 5 simultaneously exerting elastic compressive stress on the supporting structure. This means that, in the manufacture of the hybrid fan blade according to this variant, the two sheet-metal covers 4 and 5 of the enveloping structure 2 provided in the blade area are again pressed against the supporting structure with elastic pre-stress, thus providing for reduced delamination hazard and increased service-life of the blade.

LIST OF REFERENCE NUMERALS

1 Supporting structure
2 Enveloping structure
3 Former
4 Convex sheet-metal cover, suction-side
5 Concave sheet-metal cover, pressure-side
6 Weld joints.

What is claimed is:

1. A hybrid fan blade for a gas-turbine engine which comprises:
   a supporting structure of a fiber-composite material, and
   a metallic enveloping structure having a convex suction-side sheet-metal cover and a concave pressure-side sheet-metal cover connected to the latter,
   wherein the enveloping structure is confined to an airfoil area and the suction-side sheet-metal cover having an elastic tension transverse to a longitudinal axis of the hybrid fan blade and extending from a leading edge of the suction-side sheet-metal cover to a trailing edge of the suction-side sheet-metal cover when stationary such that the pressure-side sheet-metal cover is subjected to elastic compressive stress transverse to the longitudinal axis of the hybrid fan blade and extending from a leading edge of the pressure-side sheet-metal cover to a trailing edge of the pressure-side sheet-metal cover when stationary and both sheet-metal covers elastically press against the supporting structure with elastic pre-stress from a leading edge of the supporting structure to a trailing edge of the supporting structure, the elastic pre-stress initially occurs when the hybrid fan blade is stationary, before operation of the hybrid fan blade;
   the supporting structure and enveloping structure thereby forming the hybrid fan blade for the gas-turbine engine.

2. A hybrid fan blade in accordance with claim 1, and further comprising a metal former positioned at a leading edge of the blade, with the leading edges of the sheet-metal covers being welded to the metal former and the trailing edges of the sheet-metal covers being welded directly to each other at a trailing edge of the blade.

* * * * *